United States Patent
Zhang et al.

(10) Patent No.: US 12,356,908 B2
(45) Date of Patent: Jul. 15, 2025

(54) EQUIPMENT FOR IN-SITU RESTORATION OF SEDIMENT

(71) Applicant: CHINESE RESEARCH ACADEMY OF ENVIRONMENTAL SCIENCES, Beijing (CN)

(72) Inventors: Bo Zhang, Beijing (CN); Shuhang Wang, Beijing (CN); Xia Jiang, Beijing (CN); Yunyan Guo, Beijing (CN); Feifei Che, Beijing (CN); Qing Cai, Beijing (CN)

(*) Notice: Subject to any disclaimer, the term of this patent is extended or adjusted under 35 U.S.C. 154(b) by 0 days.

(21) Appl. No.: 18/879,470

(22) PCT Filed: May 30, 2023

(86) PCT No.: PCT/CN2023/097160
§ 371 (c)(1),
(2) Date: Dec. 27, 2024

(87) PCT Pub. No.: WO2024/012076
PCT Pub. Date: Jan. 18, 2024

(65) Prior Publication Data
US 2025/0160274 A1    May 22, 2025

(51) Int. Cl.
*B01D 21/00*    (2006.01)
*A01G 33/00*    (2006.01)
(Continued)

(52) U.S. Cl.
CPC ......... *A01G 33/00* (2013.01); *B01D 21/0012* (2013.01); *B01D 21/04* (2013.01);
(Continued)

(58) Field of Classification Search
CPC ............. B01D 21/0012; B01D 21/2405; E02F 3/8841; E02F 7/06
See application file for complete search history.

(56) References Cited

FOREIGN PATENT DOCUMENTS

| CN | 1252930 | 5/2000 |
|---|---|---|
| CN | 103332790 | 10/2013 |

(Continued)

OTHER PUBLICATIONS

Wu et al CN 109056866 A machine translation (Year: 2018).*
(Continued)

*Primary Examiner* — Bradley R Spies

(57) ABSTRACT

An equipment for in-situ restoration of sediment, including an amphibious platform and following devices provided on the amphibious platform: a screw suction device, one end of which is hinged to one end of the amphibious platform, and the other end can extend into the sediment for sucking up the sediment; a dehydration device that is provided downstream of the screw suction device and communicates with one end of the screw suction device; a sediment treatment device that is provided downstream of the dehydration device for treating the sediment and processing it into a planting base; a grass blanket processing device that is provided downstream of the sediment treatment device for planting submerged plants on the planting base to form a submerged grass blanket; a grass blanket paving device, one end of which is close to the grass blanket processing device, and the other end extends toward the screw suction device and into the water; a drainage pipe that respectively communicates with the dehydration device and the sediment treatment device; and a hopper through which the sediment is conveyed between the dehydration device and the sediment treatment device. In the invention, the highly polluted sediment is subjected to bio-safety disposal to form a planting base for the growth of submerged vegetation, so as to realize the in-situ restoration of the sediment of rivers and lakes.

13 Claims, 7 Drawing Sheets

(51) Int. Cl.
  *B01D 21/04* (2006.01)
  *B01D 21/24* (2006.01)
  *B09C 1/08* (2006.01)
  *E02F 3/88* (2006.01)
  *E02F 7/06* (2006.01)
(52) U.S. Cl.
  CPC ............ *B01D 21/2405* (2013.01); *B09C 1/08* (2013.01); *E02F 3/8841* (2013.01); *E02F 7/06* (2013.01); *E02F 3/885* (2013.01)

(56) References Cited

FOREIGN PATENT DOCUMENTS

| CN | 103964968 A | 8/2014 | | |
|---|---|---|---|---|
| CN | 106698871 A | 5/2017 | | |
| CN | 107032890 A | 8/2017 | | |
| CN | 109056866 A | 12/2018 | | |
| CN | 109111065 A | 1/2019 | | |
| CN | 109680749 A | 4/2019 | | |
| CN | 110451758 | 11/2019 | | |
| CN | 112219610 A | * | 1/2021 | ............ A01G 9/083 |
| CN | 212894116 | 4/2021 | | |
| CN | 113501632 | 10/2021 | | |
| CN | 115043562 A | 9/2022 | | |
| JP | H0880500 | 3/1996 | | |
| JP | 2004049933 | 2/2004 | | |
| JP | 2004202286 | 7/2004 | | |

OTHER PUBLICATIONS

Chen et al CN 112219610 A machine translation and original text (Year: 2021).*
Sun et al CN113501632 A machine translation (Year: 2021).*

* cited by examiner

EQUIPMENT FOR IN-SITU RESTORATION OF SEDIMENT

TECHNICAL FIELD

The invention relates to the technical field of polluted sediment treatment, in particular to an equipment for in-situ restoration of sediment.

BACKGROUND ART

The sediment of rivers and lakes can not only deposit and adsorb most of the pollutants in domestic sewage, agricultural sewage, and industrial wastewater, but also release pollutants into the overlying water body of the sediment when conditions such as temperature, pH, hydraulic power, and water body pollutant concentration change, resulting in persistent pollution. Wherein, the toxic and harmful pollutants in the sediment can be enriched in the organism through biological action and enter the overlying water through the migration and transformation of the water-sediment interface, and through complex physical and chemical processes, migrate and transform in the air-water-sediment and other multi-media environmental systems, affecting the digestive system and reproductive system of animals and humans, thus posing a serious threat to human survival and development. Therefore, the treatment of river and lake sediment is one of the important environmental problems to be solved urgently.

Toxic and harmful pollutants in sediments mainly include sediment nutrients, nitrogen and phosphorus pollution, heavy metals and persistent organic pollutants. Polluted sediments are usually treated by physical, chemical or biological methods to reduce the concentration of pollutants in polluted sediments. Therefore, pollutants are converted into harmless substances. In addition, polluted sediment is removed or isolated from the water body, so as to achieve the goal of treating polluted sediment. The currently applied polluted sediment treatment technologies can be roughly divided into in-situ restoration technology and ex-situ restoration technology. Wherein, the ex-situ sediment restoration technology belongs to the traditional dredging work, which realizes the treatment of polluted sediment by conveying the sediment. By applying this technology, there will be a large amount of dredging work and subsequent sediment disposal is difficult, meanwhile it destroys the original ecology of the river sediment. environment. The in-situ restoration technology is to remove certain types of pollutants in the sediment in a targeted manner, which can ensure that most of the sediment will continue to remain in rivers and lakes, but it also has a certain degree of damage to the original ecological environment of river and lake sediments.

Therefore, an amphibious in-situ restoration scheme for sediment is needed to solve the problem of damage to the original ecological environment of river sediment by in-situ restoration technology and ex-situ restoration technology.

SUMMARY OF THE INVENTION

The main purpose of the present invention is to provide an equipment for in-situ restoration of sediment, so as to at least solve the problem of damage to the original ecological environment of river sediment by in-situ restoration technology and ex-situ restoration technology.

In order to achieve the above objects, the present invention provides an equipment for in-situ restoration of sediment, including an amphibious platform and following devices provided on the amphibious platform:

a screw suction device, one end of which is hinged to one end of the amphibious platform, and the other end of which can extend into the sediment for sucking up the sediment;

a dehydration device that is provided downstream of the screw suction device and communicates with one end of the screw suction device for dehydrating the sediment;

a sediment treatment device that is provided downstream of the dehydration device for treating the sediment and processing it into a planting base;

a grass blanket processing device that is provided downstream of the sediment treatment device for planting submerged plants on the planting base to form a submerged grass blanket;

a grass blanket paving device, one end of which is close to the grass blanket processing device, and the other end of which extends toward the screw suction device and into the water for paving the submerged grass blanket to the bottom of the water;

a drainage pipe that respectively communicates with the dehydration device and the sediment treatment device;

a hopper through which the sediment is conveyed between the dehydration device and the sediment treatment device.

Preferably, the screw suction device includes:

a connecting bracket, one end of which is hinged to the amphibious platform;

a hoisting device that is connected to the middle of the connecting bracket, and is used to drive the other end of the connecting bracket to lift;

a screw suction head that is connected to the other end of the connecting bracket for sucking the sediment;

a sediment delivery pipe, one end of which communicates with the screw suction head and the other end of which communicates with the dehydration device, and the sediment delivery pipe is provided along the connecting bracket.

Preferably, the screw suction head comprises:

a collecting cover that is connected to the bottom of the connecting bracket;

a diversion cover that is fastened with the collecting cover to form a sediment suction space, and the top of which communicates with the sediment delivery pipe;

a reamer shaft that is rotatably connected to the bottom of the sediment suction space;

a reamer that is helically provided on the reamer shaft.

Preferably, the dehydration device includes a pre-dehydration device, including:

a sedimentation tank that is provided on the amphibious platform, and the sediment sucked by the screw suction device falls into the sedimentation tank from above the sedimentation tank;

a biological screening device that is connected in the sedimentation tank;

a slag scraping device that is provided above the sedimentation tank, and is used to remove large particles of impurities in the sediment;

a collection bin that is attached to the sedimentation tank and is provided on the amphibious platform.

Preferably, a water outlet is provided on the wall of the sedimentation tank, and the water outlet is communicated with the drainage pipe;

the biological screening device includes a mesh screen, which is connected to the wall of the sedimentation tank and provided above the water outlet; the slag scraping device includes a track assembly and a rake which is provided on the track assembly, one end of which is provided above the sedimentation tank and the mesh screen, and the other end of which is provided above the collection bin.

Preferably, the dehydration device also includes a vacuum dehydration device provided downstream of the pre-dehydration device, and the vacuum dehydration device includes:
a sediment storage tank that is provided on the amphibious platform, and is provided close to the sedimentation tank, for storing the sediment conveyed by the sedimentation tank;
a filter layer that is provided below the sediment storage tank, and forms a filtered water storage area with the bottom of the sediment storage tank;
a vacuum pump that is provided on the amphibious platform, the inlet of the vacuum pump communicates with the filtered water storage area, and the outlet of the vacuum pump communicates with the drainage pipe.

Preferably, the sediment treatment device includes a sediment improvement reaction device and a sediment shaping device, and the sediment improvement reaction device is provided downstream of the vacuum dehydration device and upstream of the sediment shaping device; the sediment improvement reaction device includes:
a reaction tank that is provided on the amphibious platform;
a stirrer, the top of which is connected to the top of the reaction tank, and the bottom of which extends into the bottom center of the reaction tank;
a chemical storage box which is provided above one side of the reaction tank, and communicates with the reaction tank through a chemical delivery pipe, and the chemical storage box stores sediment improvement chemicals;
the sediment shaping device includes:
a shaping device bracket which is provided on the amphibious platform, and is provided downstream of the sediment improvement reaction device, and the bottom of the shaping device bracket is provided with a working table;
a pair of mold coamings which are provided on the working table, and spliced to form a rectangular mold;
a pair of telescopic rods, each pair of which is connected to the outside of one of the mold coamings;
a sediment inlet-bucket, the top of which is provided on the shaping device bracket, and the bottom of the sediment inlet-bucket is provided on the side above the mold;
a press that is provided on the shaping device bracket and is provided above the mold, and can press the sediment within the scope of the mold to form the planting base.

Preferably, there are multiple hoppers, at least respectively provided between the sedimentation tank of the pre-dehydration device and the sediment storage tank of the vacuum dehydration device, the sediment storage tank and the reaction tanks of the sediment improvement reaction device, and the reaction tank and the sediment inlet-bucket of the sediment shaping device.

Preferably, the hopper includes:
a sediment bucket;
a rotating base that is provided on the amphibious platform;
a sediment bucket supporting arm, one end of which is hinged to the sediment bucket, and the other end of which is hinged to the rotating base, and the sediment bucket can be driven by the rotating base and the sediment bucket supporting arm to rotate in the horizontal direction, move and turn over in the vertical direction.

Preferably, the grass blanket processing device comprises:
a processing device support that is provided on the amphibious platform, and is provided with a processing platform provided along the horizontal direction;
a grass blanket fixing bin that is provided on the processing platform;
a cutting assembly that is provided above the grass blanket fixing bin, and is used to plant the submerged plant cuttings on the planting base to form a submerged grass blanket;
a transplanter that is provided on the equipment support, and is provided with a plant storage plate; the transplanter is used to convey the submerged plants on the plant storage plate to the cutting assembly;
a first push plate device that is provided on the processing platform, and is provided at one side of the grass blanket fixing bin.

Preferably, the top of the grass blanket fixing bin is provided with a cutting positioning net through which the cutting assembly is positioned;
the cutting assembly includes multiple cutting tubes, a first connecting rod, a second connecting rod, a first cutting tube and a second cutting tube, the cutting tube includes an outer tube and an inner tube, and the inner tube passes through the outer tube and is used to accommodate the submerged plants, and the top and bottom thereof are respectively exposed outside the outer tube; the bottom of the outer tube is connected to the outer wall of the inner tube, and the bottom of the inner tube is provided with an opening, the first connecting rod is connected to multiple the inner tubes, the second connecting rod is connected to the outer tube; the first cutting tube is drivingly connected to the first connecting rod along the vertical direction, the second cutting tube is drivingly connected to the second connecting rod along the vertical direction.

Preferably, the grass blanket paving device includes:
a grass blanket conveyor belt assembly that is provided on the amphibious platform along the horizontal direction, and one end of the grass blanket conveyor belt is close to the processing platform;
a paving guide rail, one end of which is connected to one end of the amphibious platform, and is provided close to the other end of the grass blanket conveyor belt, and the other end of the paving guide rail extends into the water and is close to the screw suction device;
a pair of grass blanket pressing sheets which are provided on both sides of the paving guide rail;
the grass blanket conveyor belt assembly conveys the submerged grass blanket to the paving guide rail, and the submerged grass blanket slides along the area between a pair of the grass blanket pressing sheets and the paving guide rail into water where the screw suction device is provided.

Preferably, it also includes:
a control room that at least controls the operation of the screw suction device, the dehydration device, the sediment treatment device, the grass blanket processing device, and the grass blanket paving device;
an auxiliary drive device, comprising:
a connecting rod, one end of which is hinged to the other end of the amphibious platform;

a connecting shaft that is vertically connected to the other end of the connecting rod;

a pair of driving wheels that are respectively provided at the two ends of the connecting shaft, and can extend into the water;

a driving device that is provided at the other end of the amphibious platform;

a synchronous belt assembly that is respectively connected to the driving device and the connecting rod, and the driving device drives the synchronous belt assembly to rotate, so that the connecting rod drives a pair of the driving wheels to rotate.

Compared with the prior art, the equipment for in-situ restoration of sediment provided by the present invention has at least the following beneficial effects: the sediment is sucked through the screw suction device extending into the water, the sediment is dehydrated through the dehydration device, the released water is discharged back to the original waters through a drainage pipe, the sediment is subjected to bio-safety disposal and processed to form a planting base through the sediment treatment device, submerged plants are planted on the planting base through the grass blanket processing device to form a submerged grass blanket, and the submerged grass blanket is paved to the bottom of the water through the grass blanket paving device to achieve in-situ restoration of the sediment.

The above description is only an overview of the technical solution of the present invention. In order to understand the technical means of the present invention more clearly and implement it according to the description, the preferred embodiments of the present invention and accompanying drawings are described in detail below.

BRIEF DESCRIPTION OF THE DRAWINGS

The above-mentioned and other objectives, features and advantages of exemplary embodiments of the present invention will become readily understood by reading the following detailed description with reference to the accompanying drawings. In the accompanying drawings, several embodiments of the present invention are shown in an exemplary rather than restrictive manner, and the same or corresponding reference numerals represent the same or corresponding parts, wherein.

Figure 1:
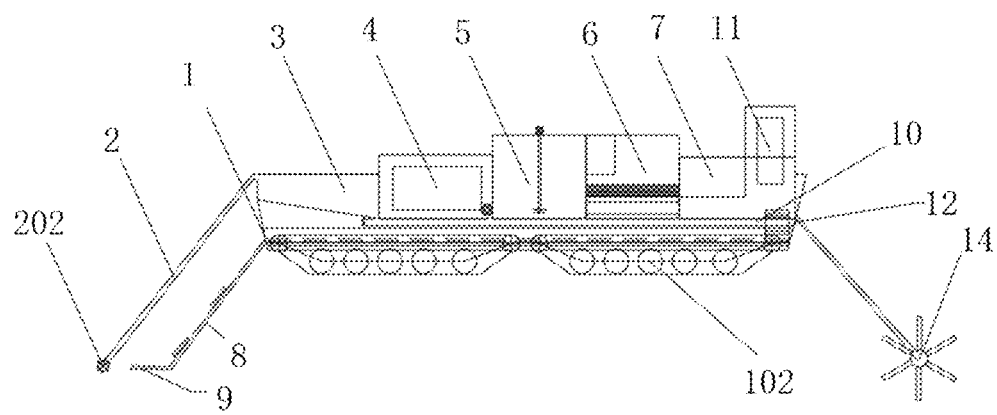
FIG. 1 shows the front view of the equipment for in-situ restoration of sediment according to an exemplary embodiment of the present invention.

EXPLANATION OF REFERENCE NUMBERS 1 amphibious platform, 101 platform body, 102 amphibious track; 2 screw suction device, 201 connecting bracket, 202 screw suction head, 203 sediment delivery pipe, 204 collecting cover, 205 diversion cover, 206 reamer shaft, 207 reamer; 3 pre-dehydration device, 301 sedimentation tank, 302 biological screening device, 303 slag scraping device, 304 collection bin, 305 track assembly, 306 rake, 307 mesh screen, 308 sediment sedimentation layer, 309 residual water layer; 4 vacuum dehydration device, 401 sediment storage tank, 402 filter layer, 403 vacuum pump, 404 filtered water storage area; 5 sediment improvement reaction device, 501 reaction tank, 502 stirrer, 503 chemical storage box; 6 sediment shaping device, 601 shaping device bracket, 602 mold coaming, 603 telescopic rod, 604 sediment inlet-bucket, 605 press, 606 work table; 7 grass blanket processing device, 701 processing device bracket, 702 grass blanket fixing bin, 703 cutting assembly, 704 transplanter, 705 first push plate device, 706 cutting positioning net, 707 positioning hole, 708 cutting tube, 709 inner tube, 710 outer tube, 711 first connecting rod, 712 second connecting rod, 713 first cutting tube, 714 second cutting tube, 715 plant storage plate, 716 manipulator, 717 positioning groove, 718 second push plate device; 8 grass blanket paving device, 801 first conveyor belt assembly, 802 second conveyor belt assembly, 803 paving guide rail, 804 grass blanket press sheets, 805 guiding device; 9 submerged grass blanket; 10 drainage pipe; 11 control room; 12 drainage port; 13 hopper, 131 sediment bucket supporting arm, 132 sediment bucket, 136 third arm, 137 sediment bucket support; 14 auxiliary drive device, 141 connecting rod, 142 connecting shaft, 143 driving wheels, 144 synchronous belt assembly.

DETAILED DESCRIPTION OF THE INVENTION

Exemplary embodiments of the present invention will be described in more detail below with reference to the accompanying drawings. Although exemplary embodiments of the present invention are shown in the drawings, it should be understood that the invention may be embodied in various forms and should not be limited to the embodiments provided forth herein. Rather, these embodiments are provided for more thorough understanding of the present invention and to fully convey the scope of the present invention to those skilled in the art.

It should be noted that, unless otherwise specified, the technical terms or scientific terms used in the present invention shall have the usual meanings understood by those skilled in the art to which the present invention belongs.

In order to solve the problems existing in the prior art, the present invention provides an equipment for in-situ restoration of sediment, as shown in FIGS. 1 to 23, including an amphibious platform 1 and the following devices provided on the amphibious platform 1:

a screw suction device 2, one end of which is hinged to one end of the amphibious platform 1, and the other end of which can extend into the sediment for sucking sediment;

a dehydration device that is provided downstream of the screw suction device 2, and is connected with one end of the screw suction device 2 for dehydrating the sediment;

a sediment treatment device that is provided downstream of the dehydration device, and is used to treat the sediment and process it into a planting base;

a grass blanket processing device 7 that is provided downstream of the sediment treatment device, and is used to plant submerged plants on the planting base to form a submerged grass blanket 9;

a grass blanket paving device 8, one end of which is close to the grass blanket processing device 7, and the other end of which extends toward screw suction device 2 and extends into the water for paving submerged grass blanket 9 to the bottom;

a drainage pipe 10 that is paved on the amphibious platform 1, and the dehydration device and the sediment treatment device are respectively communicated with the drainage pipe 10; the sediment is conveyed between the dehydration device and the sediment treatment device through a hopper 13.

By applying the equipment for in-situ restoration of sediment in the present invention: the sediment is sucked through the screw suction device 2 extending into the water, the sediment is dehydrated through the dehydration device, the released water is discharged back to the original waters through a drainage pipe 10, the sediment is subjected to bio-safety disposal and processed to form a planting base through the sediment treatment device, submerged plants are planted on the planting base through the grass blanket processing device 7 to form a submerged grass blanket 9, and the submerged grass blanket 9 is paved to the bottom of the water through the grass blanket paving device 8 to achieve in-situ restoration of the sediment.

Specifically, as shown in FIG. 1, the amphibious platform 1 includes a platform body 101 and an amphibious track 102, the platform body 101 is used to carry various devices, and the fixing of each device is realized by welding or bolting; the amphibious track 102 are connected to the lower part of the platform body 101 and is used to drive the platform body 101 to be operated in a water environment or a land environment. The amphibious platform 1 is used to support various devices. The platform body 101 provides support and installation space for each device. The amphibious track 102 is used as the power source of the platform body 101. By applying the amphibious track 102, the equipment can travel in complex muddy water environments such as rivers, lakes, sediment fields, and swamps. Wherein, the amphibious track 102, that is, the amphibious track chassis, is an existing product, and the specific structure will not be described in detail. The connection method between the amphibious track 102 and the platform body 101 can adopt a common one in the field to achieve a stable connection.

In one embodiment of the present invention, the screw suction device 2 comprises:

the connecting bracket 201, one end of which is hinged to the amphibious platform 1;

a hoisting device that is connected to the middle part of the connecting bracket 201, and is used to drive the other end of the connecting bracket 201 to lift;

the screw suction head 202 that is connected to the other end of the connecting bracket 201 for sucking the sediment;

the sediment delivery pipe 203, one end of which communicates with the screw suction head 202, and the other end of which communicates with the dehydration device, and the sediment delivery pipe 203 is provided along the connecting bracket 201.

Figure 4:
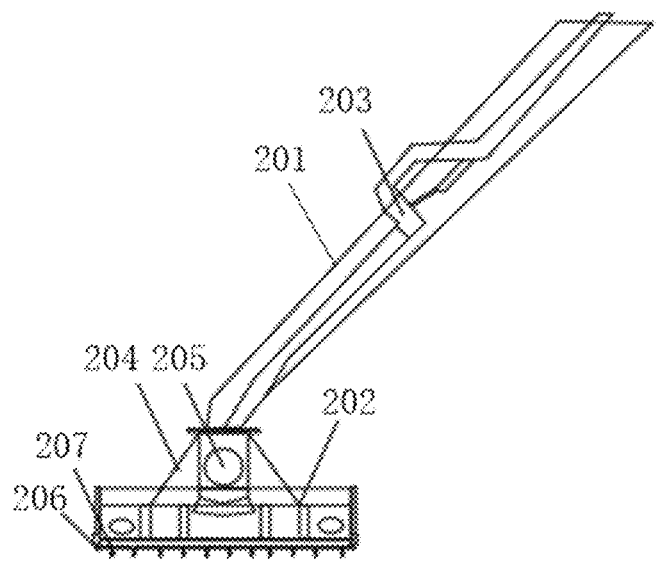
FIG. 4 shows a schematic diagram of the structure of the screw suction head in the equipment for in-situ restoration of sediment according to an exemplary embodiment of the present invention.

Wherein, as shown in FIG. 4, the screw suction head 202 includes:
- a collecting cover 204 that is connected to the bottom of the connecting bracket 201;
- a diversion cover 205 which and the collecting cover 204 are fastened to form a sediment suction space, and the top of which is connected with the sediment delivery pipe 203;
- the reamer shaft 206 that is rotatably connected to the bottom of the sediment suction space through bearings;
- the reamer 207 that is provided on the reamer shaft 206 in a spiral shape.

Specifically, the connecting bracket 201 is used to support the screw suction head 202 and provide a paving space for the sediment delivery pipe 203. One end of the connecting bracket 201 is hinged on the amphibious platform 1. The bottom of the other end of the connecting bracket 201 is provided with a first butt plate, and the top of the collecting cover 204 is provided with a second butt plate, and the first butt plate and the second butt plate are connected and fixed. The hoisting device (not shown in the drawings) is hung above the middle part of the connecting bracket 201, and the other end of the connecting bracket 201 extends into the water to form an included angle with the amphibious platform 1. The adjustment of the angle is achieved through the driving of the hoisting device, thereby achieving the lifting and lowering of the position of the screw suction head 202.

In one embodiment of the present invention, the connecting bracket 201 and the amphibious platform 1 can form an included angle of less than 90° through the hoisting device, so that the screw suction head 202 is provided at different heights, for example, at an angle of 45° or 75°. When the equipment is travelling on land, the screw suction head 202 can be lifted by adjusting the angle of the connecting bracket 201. Wherein, the hoisting device can be a sling lifting device, including a sling and a pulley. The amphibious platform 1 is provided with a hoisting bracket protruding forward, and one end of the sling goes around the pulley and is connected to the middle part of the connecting bracket 201. The other end of the rope is recovered by a rope-retracting motor provided on the amphibious platform 1. The output end of the rope-retracting motor is connected with a rope-retracting reel, and the other end of the sling is wound on the rope-retracting reel, and the rope-retracting motor drives the rope-retracting reel to rotate, so that the end of the sling connected to the connecting bracket 201 rises or falls, thereby adjusting the angle between the connecting bracket 201 and the horizontal direction, making the other end of the connecting bracket 201 lift; the screw suction head 202 is connected to the other end of the connecting bracket 201, so the vertical lifting of the screw suction head 202 can be realized, thus it is suitable for different heights of sediment suction, or the screw suction head 202 can be adjusted according to the thickness of the sediment to be restored. Wherein, the sling can be a steel wire rope.

In another embodiment of the present invention, the hoisting device may also be a crane. Correspondingly, the amphibious platform 1 is provided with installation components and driving components for installing the crane.

In other embodiments of the present invention, it is also possible to use other driving methods in the field that can realize the lifting of the other end of the connecting bracket 201, such as through a hydraulic cylinder or a cylinder hinged between the amphibious platform 1 and the connecting bracket 201, the expansion and contraction of which drives the connecting bracket 201 to rotate, thereby realizing the lifting of the screw suction head 202.

As shown in FIG. 4, in the screw suction head 202, the collecting cover 204 includes a reamer installation section and a flow-collecting section, the reamer installation section is hollow and placed horizontally, and the reamer shaft 206 is rotatably connected in the reamer installation section; the flow-collecting section which is a hollow trapezoidal structure is communicated with the top of the reamer installation section, and the bottom of the flow-collecting section is communicated with the reamer installation section; the diversion cover 205 is semi-cylindrical, and is fastened on one side of the flow-collecting section, the diversion cover 205, the flow-collecting section, and the reamer installation section jointly form a sediment suction space, wherein, the inside of the reamer installation section is the bottom of the sediment suction space, and the space between the diversion cover 205 and the flow-collecting section is the top of the sediment suction space.

There are multiple reamers 207 that are connected to the reamer shaft 206 in a spiral shape. The reamer shaft 206 is rotatably connected to the lower part of the reamer installation section, so that the outer edge of the reamer 207 protrudes from the bottom of the collecting cover 204, so that the sediment can be raked.

The reamer shaft 206 is respectively rotatably connected to two ends of the flow-collecting section of the collecting cover 204 through bearings. In one embodiment of the present invention, the reamer shaft 206 is driven to rotate by a reamer motor. The reamer motor is a submersible motor, which is connected to the outside of the collecting cover 204. The output shaft of the reamer motor is connected with the reamer shaft 206 through a shaft coupling, and the reamer motor, the reamer shaft 206 and the shaft coupling are hermetically connected. The driving of the reamer motor drives the reamer shaft 206 and the reamer 207 to rotate synchronously, so that the reamer 207 rakes the sediment at the bottom of the water to disperse the sediment for easy suction.

Figure 5:
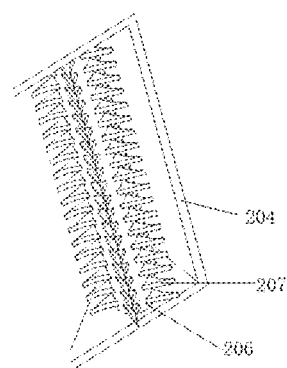
FIG. 5 shows the schematic diagram of the bottom structure of the screw suction head in the equipment for in-situ restoration of sediment according to an exemplary embodiment of the present invention.

As shown in FIG. 5, the reamer 207 can be jigsaw-like, and one side of the reamer 207 is arc-shaped, and the outer edge of the reamer 207 away from the reamer shaft 206 is a tip, so that it can be inserted into the sediment at the bottom of the water to break up and rake it. A sediment outlet is provided in the middle part of the diversion cover 205, and the sediment outlet communicates with the sediment delivery pipe 203. Driven by the reamer motor, the reamer shaft 206 and the reamer 207 are driven to rotate synchronously, so that the reamer 207 breaks up the sediment at the bottom of the water, and the dispersed sediment is gathered into the sediment suction space through the rotation of the reamer 207, and is conveyed through the sediment delivery pipe 203 at the sediment outlet.

In one embodiment of the present invention, the screw suction device 2 can also include a sediment delivery pump that (not shown in the drawings) is provided on the sediment delivery pipe 203, and can be used to provide negative pressure, which further provides upward power for the sediment in sediment delivery pipe 203, so that the sediment collected in the sediment suction space enters the sediment delivery pipe 203 and is continuously conveyed upward. Wherein, the sediment delivery pump, which needs to be sealed and waterproofed, can be provided at the sediment outlet, or can also be provided in the middle of the sediment delivery pipe 203, so that it can be exposed outside the water surface, avoiding immersion in water.

In one embodiment of the present invention, the dehydration device includes a pre-dehydration device 3;

the pre-dehydration device 3 comprises:
a sedimentation tank 301 that is provided on the amphibious platform 1, and the sediment sucked by the screw suction device 2 falls into the sedimentation tank 301 from above the sedimentation tank 301;
a biological screening device 302 that is connected in the sedimentation tank 301, for screening aquatic organisms in the sediment;
a slag scraping device 303 that is provided above the sedimentation tank 301 for removing large particles of impurities in the sediment;
a collection bin 304 that is attached to the sedimentation tank 301 and provided on the amphibious platform 1;
wherein, the wall of the sedimentation tank 301 is provided with a water outlet that is connected to the drainage pipe 10;
the biological screening device 302 includes a mesh screen 307 that is connected to the wall of the sedimentation tank 301, and is provided above the water outlet;
the slag scraping device 303 includes a track assembly 305 and a rake 306 that is provided on the track assembly 305. One end of the track assembly 305 is provided above the sedimentation tank 301 and above the screen 307, and the other end is provided above the collection bin 304.

Since the screw suction device 2 sucks the sediment after breaking up the sediment, the sediment sucked contains a large amount of water; the water-containing sediment is initially dehydrated by the pre-dehydration device 3, so most of the water can be removed, which facilitates the convey and processing of the subsequent processing technology.

Figure 6:
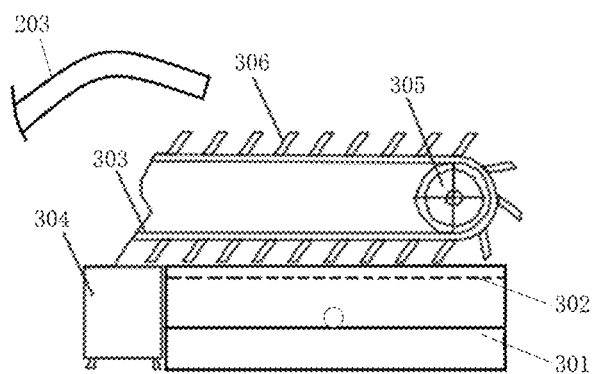
FIG. 6 shows a schematic diagram of the structure of the pre-dehydration device in the equipment for in-situ restoration of sediment according to an exemplary embodiment of the present invention.
Figure 7:
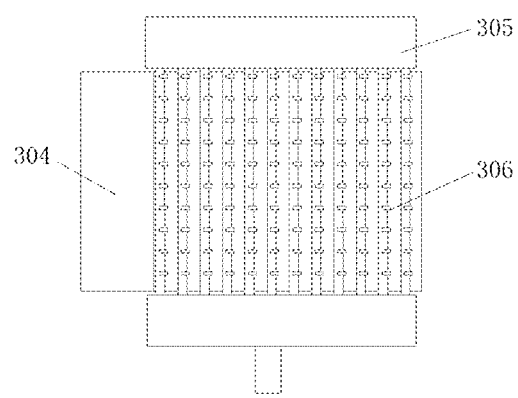
FIG. 7 shows the top view of the pre-dehydration device in the equipment for in-situ restoration of sediment according to an exemplary embodiment of the present invention.
Figure 8:
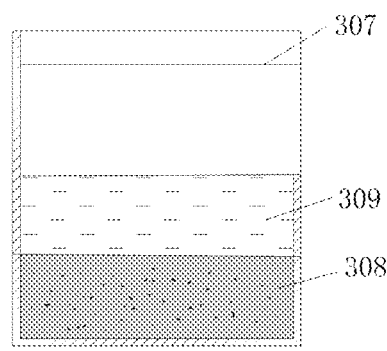
FIG. 8 shows a cross-sectional view of a sedimentation tank in the equipment for in-situ restoration of sediment according to an exemplary embodiment of the present invention.

Specifically, as shown in FIGS. 6 to 8, the sedimentation tank 301 is fixed on the amphibious platform 1, and one end of the sediment delivery pipe 203 is communicated with the screw suction head 202, and the other end of the sediment delivery pipe 203 extends on the top of the sedimentation tank 301, thereby discharging the sediment sucked by the screw suction device 2 into the sedimentation tank 301. Wherein, since the sediment delivery pipe 203 is a soft pipe, a fixed pipe frame for fixing the sediment delivery pipe 203 can be provided above the sedimentation tank 301, thus the sediment delivery pipe 203 can be fixed by clamping. The fixed pipe frame can be a structure known in the art that can realize the function of clamping the sediment delivery pipe 203. The biological screening device 302 includes a mesh screen 307 that is fit to the sedimentation tank 301.

In one embodiment of the present invention, as shown in FIG. 8, the sedimentation tank 301 is a rectangle, comprising interconnected containing tank sections at the bottom and separation tank sections at the top, wherein the separation tank sections include three sequentially connected side walls which form a three-sided structure, the missing side is the notch side, and the containing tank section includes four side walls connected in sequence. The mesh screen 307 is rectangular, and the three edges of which are connected with the separation tank section of the sedimentation tank 301 by bolts, so that the mesh screen 307 is disassembled and cleaned when necessary. The water outlet is provided in the middle of the containing tank section, and corresponds to the notch side of the separation tank section, and the water outlet is connected to the drainage pipe 10 through a pipeline.

The water-containing sediment falling from the top of the sedimentation tank 301 enters the inside of the sedimentation tank 301 through the mesh screen 307 of the biological screening device 302, and the aquatic organisms such as shellfish and large particle impurities are filtered by the mesh screen 307 and stay thereon, wherein aquatic organisms can be selected manually to return to the water while impurities can be put into the collection bin 304 for centralized disposal. The mesh screen 307 can be provided with an avoidance opening near the notch side of the separation tank section of the sedimentation tank 301, so that it can extend into the sedimentation tank 301 through the avoidance opening from top to bottom, and dig out the sediment. In the present invention, the separation tank section of the sedimentation tank 301 is provided as a three-sided structure, so that the hopper 13 extends into the sedimentation tank 301 from the notch side of the separation tank section of the sedimentation tank 301, and dig out the sediment and convey it to the next processing procedure.

After the water-containing sediment falling from the top of the sedimentation tank 301 enters the sedimentation tank 301 through the biological screening device 302, the sediment freely falls into the bottom of the sedimentation tank 301 through the self-sedimentation action of the sediment, forming a sediment sedimentation layer 308, while large part of the water gathers above the sediment to form a residual water layer 309, and the middle part of the containing tank section of the sedimentation tank 301 is provided with a water outlet, through which most of water in the water-containing sediment, that is, the residual water layer 309 is discharged to the drainage pipe 10 and discharged to the original waters to realize the pre-dehydration process of the sediment. A valve can be provided at the water outlet to control the flow of water.

One end of the slag scraping device 303 is provided above the sedimentation tank 301 and below the sediment delivery pipe 203, and the other end is provided above the collection bin 304. Specifically, a track assembly 305 includes a pair of rake synchronous belts and a pair of rake synchronous belt driving devices, each rake synchronous belt is driven by a rake synchronous belt driving device to rotate, and a pair of rake synchronous belts are respectively provided on both sides of the sedimentation tank 301; the rake synchronous belt driving device includes a rake driving motor, a rake driving wheel and a rake driven wheel. The rake driving motor drives the rake driving wheel to rotate, driving the rake driven wheel to rotate, thereby achieving the rotation of the rake synchronous belt. The rake driving wheel is fixedly connected with the output shaft of the rake driving motor and coaxially provided. The rake 306 includes multiple rake blade installation plates and multiple rake blades provided on each rake blade installation plate, and the two ends of multiple rake blade installation plates are connected to a pair of rake synchronous belts respectively, and are provided at intervals, thus facilitating the passage of sediment through the gaps between adjacent rake blade installation plates, wherein each rake blade installation plate is provided with multiple rake blades parallel to each other, the rake blades are provided to tilt from bottom to top and from front to back along the movement direction of the rake synchronous belts, and the rake blades and the rake synchronous belts rotate synchronously, which can remove floating debris such as large particle impurities, water plants, ropes, and other debris from the water-contained bottom sediment. The collection bin 304 is attached to the sedimentation tank 301, so that the impurities taken away by the slag scraping device 303 can fall into the collection bin 304 by gravity, which is convenient for centralized disposal. When the rake blades are entangled with aquatic plants or ropes that are difficult to fall by their own gravity, they can be hooked into the collection bin 304 by manually holding a long hook or the like.

In one embodiment of the present invention, the slag scraping device 303 is provided close to the biological screening device 302, so that the aquatic organisms such as shellfish and large-particle impurities staying on the mesh screen 307 can be directly brought into the collection bin 304 through the slag scraping device 303, and the former can be sent back to the original waters through manual selection. Wherein, due to the biological characteristics of aquatic organisms, the organisms sucked by the screw suction device 2 and conveyed with the sediment are mostly shellfish, but aquatic organisms such as fish will not be sucked, and shellfish mostly have a relatively hard shell. Therefore, even if brought into the collection bin 304 by the slag scraping device 303, they will not be damaged.

When the water-containing sediment conveyed by the sediment delivery pipe 203 is released from top to bottom, the water-containing sediment first passes through the slag scraping device 303 to remove water plants and other sundries, and then the biological screening device 302 screens out large particles of impurities and collects them in the collection bin 304, the sediment entering the sedimentation tank 301 through the two screening processes is relatively fine, or the particles thereof are small, which can benefit the subsequent treatment process.

After the sedimentation tank 301 pre-dehydrates the sediment entering it, there is still a certain amount of water in the sedimentation tank 301, and the sediment dug out by the hopper 13 still has a high-water content. Thus, further dehydration of the sediment is required.

Figure 9:
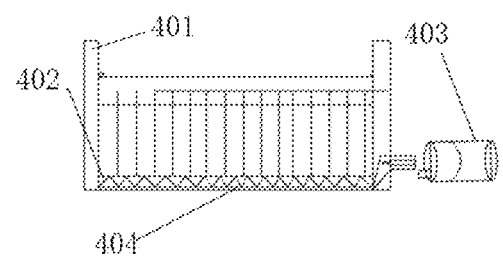
FIG. 9 shows a schematic diagram of the structure of a vacuum dehydration device in the equipment for in-situ restoration of sediment according to an exemplary embodiment of the present invention.

Specifically, as shown in FIG. 9, the dehydration device also includes a vacuum dehydration device 4 provided downstream of the pre-dehydration device 3, including:

a sediment storage tank 401 that is provided on the amphibious platform 1, and is provided close to the sedimentation tank 301, for storing the sediment conveyed by the sedimentation tank 301;

a filter layer 402 that is provided below the sediment storage tank 401, and forms a filtered water storage area 404 with the bottom of the sediment storage tank 401;

a vacuum pump 403 that is provided on the amphibious platform 1, the inlet of the vacuum pump 403 communicates with the filtered water storage area 404, and the outlet of the vacuum pump 403 communicates with the drainage pipe 10.

The sediment in the sediment sedimentation layer 308 in the sedimentation tank 301 is excavated through the hopper 13 and conveyed from the top of the sediment storage tank 401 to the sediment storage tank 401, and the filtered water storage area 404 is provided with a negative pressure through the vacuum pump 403, thus the water in the sediment passes through the filter layer 402 and collects into the filtered water storage area 404, then is conveyed into the drainage pipe 10 by the vacuum pump 403, and is discharged to the original waters through the drainage pipe 10, while the sediment is stopped above the filter layer 402, thereby a sediment with a lower water content is formed for further processing.

Wherein, the vacuum pump 403 is an existing product, which can be a vacuum water pump, which can extract air to provide negative pressure when there is no water in the filtered water storage area 404, and extract filtered water to realize dehydration of the sediment when there is filtered water.

Filter layer 402 can be made of conventional filter material to separate water and sediment. The bottom of the sediment storage tank 401 is provided with a pair of installation partitions, and each of which is provided with permeable holes; the filter layer 402 is placed below a pair of installation partitions; the sediment in the sediment storage tank 401 enters the filter layer 402 through the permeable holes, and then passes through the filter layer 402 to filter, and then through the permeable holes of the installation partitions provided below to enter the filtered water storage area 404, the dehydrated sediment is stored in the sediment storage tank 401, and is provided above the installation partitions.

In one embodiment of the present invention, the outer bottom of the sediment storage tank 401 can be provided with a maintenance opening corresponding to the filter layer 402 that is inserted between a pair of installation partitions through the maintenance opening, and is hermetically connected to the sediment storage tank 401 so that the filter layer 402 can be easily replaced.

In other embodiments of the present invention, the upper installation partition is placed on the fixed plate provided on the wall of the sediment storage tank 401, so as to realize the installation of the installation partition and the sediment storage tank 401. When the filter layer 402 needs to be replaced, all installation partitions and filter layer 402 provided above shall be removed and replaced.

The pre-dewatered sediment is vacuum-dehydrated by the vacuum dehydration device 4, thereby further reducing the water content of the sediment, so as to facilitate subsequent processing. Wherein, the pre-dehydrated sediment is conveyed from the sedimentation tank 301 to the sediment storage tank 401 through the hopper 13.

Figure 10:
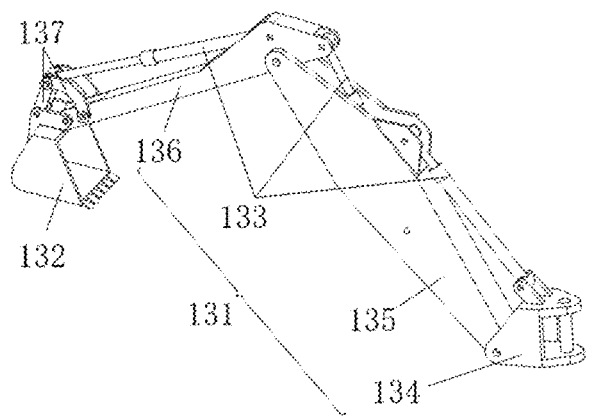
FIG. 10 shows a schematic diagram of the structure of a hopper in the equipment for in-situ restoration of sediment according to an exemplary embodiment of the present invention.

Specifically, in one embodiment of the present invention, as shown in FIG. 10, the hopper 13 includes:

a sediment bucket 132;

a rotating base that is provided on the amphibious platform 1;

a sediment bucket supporting arm 131, one end of which is hinged to the sediment bucket 132, and the other end of which is hinged to the rotating base, and the sediment bucket 132 can be driven by the rotating base and the sediment bucket supporting arm 131 to rotate along the horizontal direction, move and turn over vertically.

Wherein, the rotating base, that is, the rotating platform, can be fixed on the amphibious platform 1 through an installation bracket, and is used to provide rotating motion to the sediment bucket supporting arm 131. The rotating base is an existing product, and the specific structure and rotating principle will not be repeated.

As shown in FIG. 10, the sediment bucket supporting arm 131 includes three driving cylinders 133 and a first arm 134, a second arm 135 and a third arm 136 which are sequentially connected from bottom to top. The three driving cylinders 133 are respectively the first driving cylinder, the second driving cylinder and the third driving cylinder; the first arm 134 is connected to the top of the rotating support through an installation flange, so that it can rotate under the drive of the rotating support. The bottom of the second arm 135 is hinged to one side of the bottom of the first arm 134, and the middle part of the second arm 135 is connected to the top of the first arm 134 through the first driving cylinder, which can drive the second arm 135 and the first arm 134 to rotate through the expansion and contraction of the first driving cylinder. The third arm 136 forms an L shape with the second arm 135, and one end of the third arm 136 near the end part is hinged on the top of the second arm 135, and the end part of one end of the third arm 136 is connected to the bottom of the second arm 135 through the second driving cylinder. Wherein, the second driving cylinder is provided along the second arm 135, and the third arm 136 and the second arm 135 can be driven to rotate through the expansion and contraction of the second driving cylinder.

The sediment bucket 132 is hinged to the other end of the third arm 136 through a sediment bucket support 137 which includes a hinged first connecting portion and a second connecting portion, wherein one end of the first connecting portion is fixedly connected to one side of the top of the sediment bucket 132, the other side of the top of the sediment bucket 132 is rotationally connected with the other end of the third arm 136; the end of the second connecting portion away from the first connecting portion is rotationally connected with the other end of the third arm 136, and the hinge joint of the first connecting portion and the second connecting portion is connected to one end of the third arm 136 through a third driving cylinder which is provided along the third arm 136, and the expansion and contraction of the third driving cylinder can make the included angle between the first connecting portion and the second connecting portion change, so that the sediment bucket 132 turns over. The sediment bucket 132 is a bucket structure, and it is provided with a dredging mouth that is provided toward the sediment bucket supporting arm 131. Three driving cylinders 133 can respectively drive the second arm 135, the third arm 136 and the sediment bucket support 137 of the sediment bucket supporting arm 131 to rotate in the vertical direction, and drive the sediment bucket supporting arm 131 to rotate in the horizontal direction through the rotating base, so that the sediment bucket 132 moves to a first preset position along a first preset trajectory, and excavates the sediment in the sedimentation tank 301, then conveys it into the sediment storage tank 401.

In other embodiments of the present invention, the hopper 13 can also include a sediment bucket 132, a sediment bucket installation bracket and an industrial mechanical arm, wherein the industrial mechanical arm can be a six-axis robot, and the sediment bucket 132 is connected to the working end of the mechanical arm of through the sediment bucket installation bracket, multi-degree-of-freedom movement thereof can be realized through the industrial mechanical arm, so as to drive the sediment bucket 132 to move along a preset trajectory to dig out the sediment in the sedimentation tank 301 and then convey it to the sediment storage tank 401. The industrial mechanical arm is an existing product, and the specific structure and working principle will not be repeated here.

Since the sediment contains harmful pollutants, it is necessary to consider removing harmful pollutants when treating and restoring the sediment. Therefore, the present invention provides a sediment treatment device to treat the dehydrated sediment.

Figure 2:
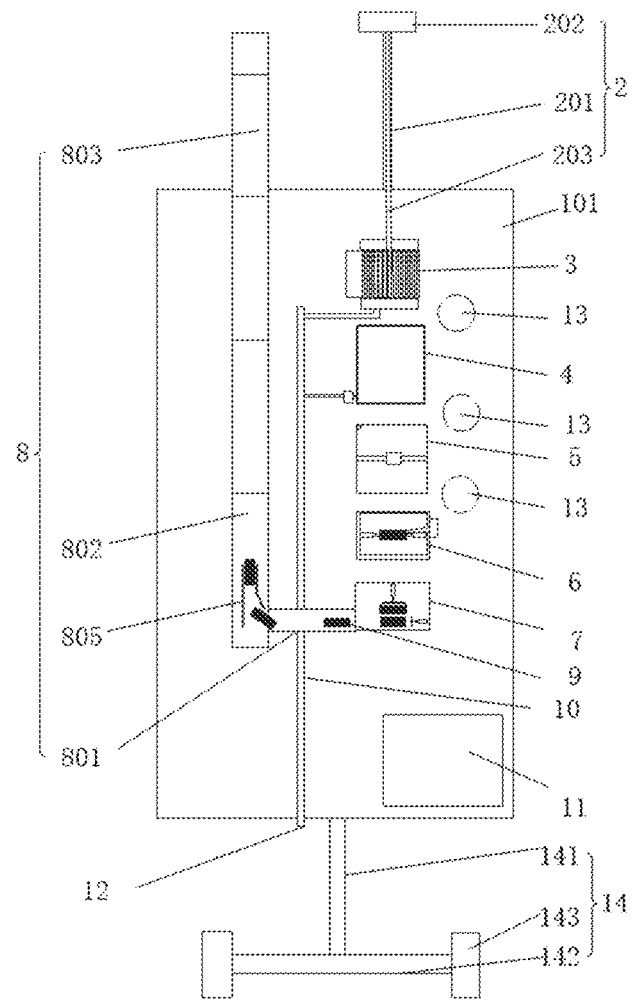
FIG. 2 shows the top view of the equipment for in-situ restoration of sediment according to an exemplary embodiment of the present invention.

Specifically, as shown in FIGS. 1 and 2, the sediment treatment device includes a sediment improvement reaction device 5 and a sediment shaping device 6. The sediment improvement reaction device 5 is provided downstream of the vacuum dehydration device 4 and upstream of sediment shaping device 6;

the sediment improvement reaction device 5 comprises:
a reaction tank 501 that is provided on the amphibious platform 1;
a stirrer 502, the top of which is connected to the top of the reaction tank 501, and the bottom of the stirrer 502 extends into the bottom center of the reaction tank 501;
a chemical storage box 503 that is provided above one side of the reaction tank 501 and communicates with the reaction tank 501 through a chemical delivery pipe. The chemical storage box 503 stores sediment improvement chemicals.

Wherein, the convey of the sediment between the reaction tank 501 and the sediment storage tank 401 is realized through the hopper 13 that excavates the dehydrated sediment in the sediment storage tank 401, and moves it to the second preset positions along the second preset trajectory, that is, above the reaction tank 501, allowing the dehydrated sediment to fall into the reaction tank 501 from top to bottom.

Figure 11:
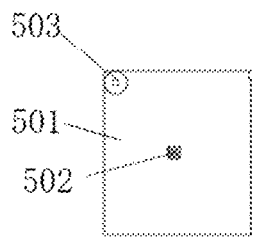
FIG. 11 shows the top view of the sediment improvement reaction device in the equipment for in-situ restoration of sediment according to an exemplary embodiment of the present invention.

As shown in FIG. 11, the stirrer 502 is provided in the middle of the reaction tank 501, and the stirrer 502 can be driven by a stirring motor to realize stirring. The stirring motor can be connected to the top of the reaction tank 501 through a motor bracket, thereby driving the stirrer 502 to stir the sediment and the chemicals in the reaction tank 501, so that the sediment and the chemicals are mixed evenly. The chemical storage box 503 is connected above the reaction tank 501 through the chemical box installation bracket, and is close to the wall of the reaction tank 501, so as to avoid affecting the stirring of the stirrer 502 and the convey route of the hopper 13.

In one embodiment of the present invention, a metering pump is provided at the connection between the chemical storage tank 503 and the chemical delivery pipe, the inlet of the metering pump communicates with the outlet of the chemical storage tank 503, and the outlet of the metering pump communicates with the chemical delivery pipe. The chemicals in the chemical storage tank 503 is pumped out by the metering pump, and delivered to the reaction tank 501 through the chemical delivery pipe. The metering pump can pump out the chemicals by metering or at intervals of time to make sure that the chemicals react with the sediment in the reaction tank 501.

In one embodiment of the present invention, the chemicals in the chemical storage tank 503 can be an oxidized chemical such as calcium oxide, and the chemicals can oxidize the reducing substances in the sediment to achieve the goal of harmlessness. A chemical stirrer may also be provided in the chemical storage box 503 to stir the chemicals.

The sediment dehydrated by the vacuum dehydration device 4 enters the reaction tank 501 of the sediment improvement reaction device 5, and undergoes an improvement reaction through chemicals, thereby obtaining a relatively dry sediment with a water content lower than 60%, which is beneficial to the follow-up process processing.

Figure 12:
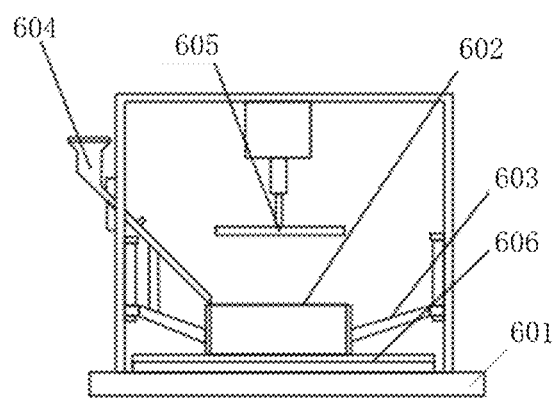
FIG. 12 shows a schematic diagram of the structure of the sediment shaping device in the equipment for in-situ restoration of sediment according to an exemplary embodiment of the present invention.
Figure 13:
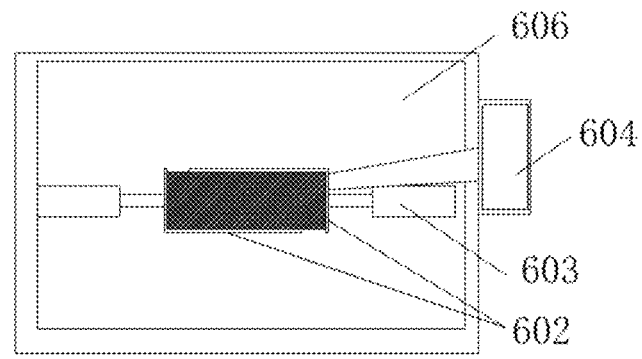
FIG. 13 shows a top view of the mold of the sediment shaping device in the equipment for in-situ restoration of sediment according to an exemplary embodiment of the present invention.

Specifically, as shown in FIG. 12 and FIG. 13, the sediment shaping device 6 includes:
a shaping device bracket 601 that is provided on the amphibious platform 1, and is provided downstream of the sediment improvement reaction device 5, and the bottom of the shaping device bracket 601 is provided with a working table 606;
a pair of mold coamings 602 that are provided on the working table 606, and spliced to form a rectangular mold that is used to accommodate the sediment;
a pair of telescopic rods 603, each pair of which is connected to the outside of a mold enclosure 602;
a sediment inlet-bucket 604, the top of which is provided on the shaping device bracket 601, and the bottom of the sediment inlet-bucket 604 is provided on the side above the mold;

a press 605 that is provided on the shaping equipment support 601, and is provided above the mold, it can press the sediment within the scope of the mold to form a planting base.

Wherein, as shown in FIG. 2, the convey of dry sediment is realized between the sediment inlet-bucket 604 and the reaction tank 501 of the sediment improvement reaction device 5 through the hopper 13 which can be provided between the reaction tank 501 and the shaping device bracket 601, so that the dry sediment in the reaction tank 501 can be dredged and poured into the sediment inlet-bucket 604 along the third preset trajectory. The telescopic rod 603 can be a cylinder, and a pair of telescopic rods 603 are respectively connected to a pair of mold coamings 602, so that a pair of the mold coamings 602 can be driven to move away from each other in order to move the planting base.

In one embodiment of the present invention, the mold coamings 602 are L-shaped, and a pair of mold coamings 602 are provided opposite to each other. When a pair of mold coamings 602 move toward each other under the drive of the telescopic rod 603, they are close to each other to form a mold with a rectangular cross section, and the bottom of the sediment inlet-bucket 604 is provided on the upper side of the mold, so that the dry sediment in the sediment inlet-bucket 604 enters the mold, and is pressed down by the press 605 to realize the extruding and shaping of the dry sediment, forming a relatively dry, moderately hard sediment planting base that is easy to take. Alternatively, when a pair of the mold coamings 602 move away from each other under the drive of the telescopic rod 603, a pair of the mold coamings 602 are separated from each other, so that the extruded planting base can be taken out.

When a pair of mold coamings 602 are spliced to form a mold with a rectangular cross-section, there may be a gap of a certain size between a pair of the mold coamings 602 to facilitate the separation thereof; since the dry sediment has a certain viscosity, it will not flow from between the mold. The distance between a pair of mold coamings 602 can be adjusted adaptively to meet the needs of different sizes of planting bases. Similarly, the pressing height of the press 605 can also be adjusted to adjust the thickness of the planting base.

Wherein, the upper part of the sediment inlet-bucket 604 is a bucket-shaped structure, and the bottom is a long tubular structure, which is the output port. The outlet of the sediment inlet-bucket 604 is provided with a discharge pump, so that the dry sediment that enters the mold scope through the sediment inlet-bucket 604 can be intermittently injected into the mold with a preset amount, which makes the shape and specification of the planting base extruded by the press 605 uniform. Press 605 is an existing product, which is used to press down to form the sediment in the mold, and the specific structure and working principle will not be repeated.

In one embodiment of the present invention, the extruded planting base can be taken manually and applied in a subsequent processing procedure.

The convey of formed sediment between each treatment process can be realized by the hopper 13. In the present invention, there are multiple hoppers 13, which are at least respectively provided between the sedimentation tank 301 of the pre-dehydration device 3 and the sediment storage tank 401 of the vacuum dehydration device 4, the sediment storage tank 401 and the reaction tank 501 of the sediment improvement reaction device 5, and the reaction tank 501 and the sediment inlet-bucket 604 of the sediment shaping device 6 so as to realize the convey of sediment.

When the sediment is subjected to bio-safety disposal by the sediment improvement reaction device 5 in the sediment treatment device, the sediment is restored, extruded and shaped by the sediment shaping device 6 to form a planting base. After that, submerged plants in the original waters are planted on the base and put them back into the original waters to achieve in-situ restoration.

Concretely, as shown in FIG. 14 to FIG. 23, grass blanket processing device 7 comprises:
- a processing device support 701 that is provided on the amphibious platform 1, and is provided with a processing platform provided along the horizontal direction;
- a grass blanket fixing bin 702 that is provided on the processing platform for accommodating the planting base;
- a cutting assembly 703 that is provided above the grass blanket fixing bin 702;
- a transplanter 704 that is provided on the processing device support 701, the transplanter 704 is provided with a plant storage plate 715 and is used to convey the submerged plants on the plant storage plate 715 to the cutting assembly 703, the cutting assembly 703 is used to plant submerged plants through cutting in the planting base to form a submerged grass blanket 9;
- a first push plate device 705 that is provided on the processing platform, and is positioned at the side of the grass blanket fixing bin 702, for first pushing the planting base placed on the processing platform along the horizontal direction;
- wherein, along the pushing direction of the first push plate device 705, one end of the grass blanket fixing bin 702 towards the first push plate device 705 is provided with an inlet of the planting base, and the other end is provided with an outlet of the grass blanket;
- the top of the grass blanket fixing bin 702 is provided with a cutting positioning net 706 through which the cutting assembly 703 is positioned;
- a cutting assembly 703, including multiple cutting tubes 708, a first connecting rod 711, a second connecting rod 712, a first cutting tube 713 and a second cutting tube 714, the cutting tube 708 includes an outer tube 710 and an inner tube 709, and the inner tube 709 passes through the outer tube 710 for accommodating submerged plants, and the top and bottom of the inner tube 709 are respectively exposed outside the outer tube 710; the bottom of the outer tube 710 is connected with the outer wall of the inner tube 709, and the bottom of the inner tube 709 is provided with an opening; the first connecting rod 711 is connected to the inner tubes 709 of multiple cutting tubes 708, and the second connecting rod 712 is connected to the outer tubes 710 of the cutting tubes 708. The first cutting tube is drivingly connected to the first connecting rod 711 along the vertical direction, and the second cutting tube 714 is drivingly connected to the second connecting rod 712 along the vertical direction.

When the planting base is placed on the processing platform, the first push plate device 705 pushes the planting base into the scope of the grass blanket fixing bin 702, and the cutting assembly 703 grows the submerged plants on the planting base through cutting to form a submerged grass blanket 9, then the first push plate device 705 pushes the submerged grass blanket 9 out of the scope of the grass blanket fixing bin 702.

Figure 14:
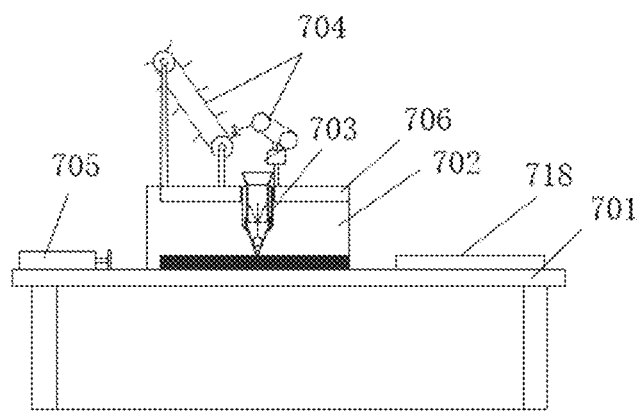
FIG. 14 shows a side view of the grass blanket processing device in the equipment for in-situ restoration of sediment according to an exemplary embodiment of the present invention.

Specifically, as shown in FIG. 14, the processing device bracket 701 is used to connect to the amphibious platform 1 and support various components of the grass blanket processing device 7. The top of the processing device support 701 is provided with a processing platform for placing the planting base.

Figure 15:
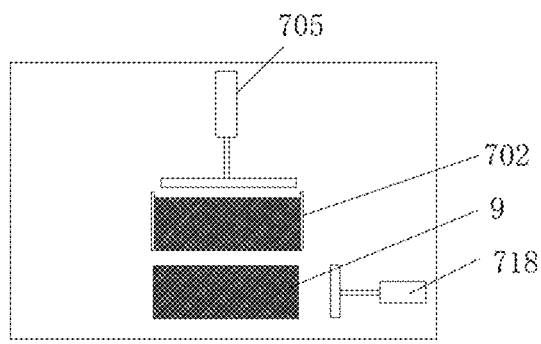
FIG. 15 shows the top view of the grass blanket fixing bin in the equipment for in-situ restoration of sediment according to an exemplary embodiment of the present invention.

As shown in FIG. 15, the grass blanket fixing bin 702 includes a pair of spacing plates parallel to each other, for placing the planting base so that the planting base is provided between a pair of the spacing plates. Here, the planting base can be manually scooped up from the mold of the sediment shaping device 6, and then place between a pair of spacing plates from the inlet of the planting base.

Figure 16:
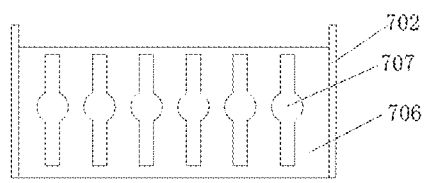
FIG. 16 shows a top view of the cutting positioning net in the equipment for in-situ restoration of sediment according to an exemplary embodiment of the present invention.

The top of the grass blanket fixing bin 702 is provided with a cutting positioning net 706, as shown in FIG. 16, the cutting positioning net 706 is provided with multiple positioning holes 707, and each positioning hole 707 corresponds to a position point for cutting on the planting base. The positioning hole 707 includes a pair of rectangular bar holes and a pair of circular holes provided in the middle of a pair of the rectangular bar holes. The diameter of the circular holes is larger than the width of the rectangular bar holes, and is used to align the positioning points of the planting base. The rectangular bar holes are used to provide deformation space for the circular holes.

Figure 17:
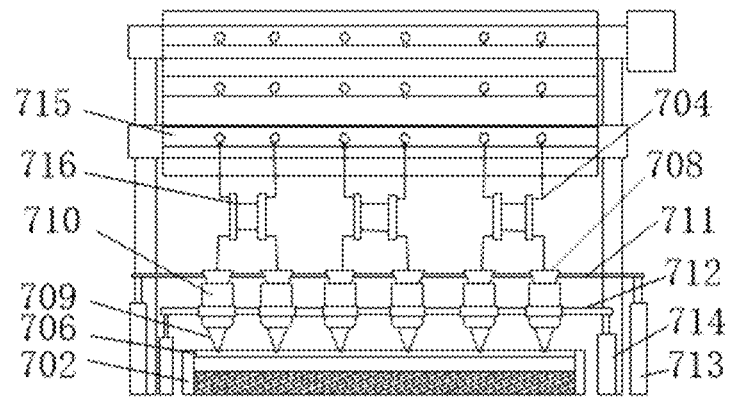
FIG. 17 shows a schematic diagram of the positional relationship between the cutting assembly and the transplanter in the equipment for in-situ restoration of sediment according to an exemplary embodiment of the present invention.

As shown in FIG. 17, the bottom of the inner tube 709 of the cutting assembly 703 is exposed outside the outer tube 710, and has an opening, so that the inner tube 709 and the outer tube 710 can be driven by the joint action of the first cutting tube 713 and the second cutting tube 714 at the same time to lower and press the planting base, and when the second cutting tube 714 drives the second connecting rod 712 to rise, the outer tube 710 drives the bottom opening of the inner tube 709 to open to plant submerged plants on the planting base.

In one embodiment of the present invention, as shown in FIG. 17, the first connecting rod 711 can be connected to the tops of the inner tubes of multiple cutting tubes 708 by welding through multi-section connecting units, each connecting unit is provided coaxially, and the second connecting rod 712 is provided with multiple connecting ring parts, and the outer tube 710 of each cutting tube 708 passes through one connecting ring part. The first cutting tube 713 is a pair, which is respectively drivingly connected to the two ends of the first connecting rod 711, and the second cutting tube 714 is a pair, which is respectively drivingly connected to the two ends of the second connecting rod 712.

Figure 18:
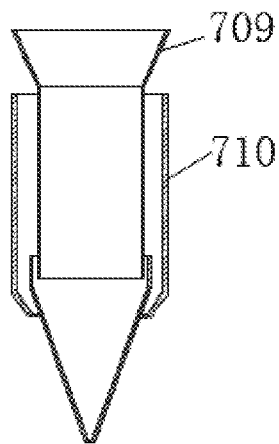
FIG. 18 shows a cross-sectional view of the cutting tube in the equipment for in-situ restoration of sediment according to an exemplary embodiment of the present invention.

Wherein, as shown in FIG. 18, the inner tube 709 includes a conical tube section, a straight tube section, and a flaring section connected sequentially from bottom to top. Wherein, the bottom of the conical tube section is a gathered tip, and the tip is provided downward, the bottom of the outer tube 710 is inclined inwardly, and is connected to the outer wall of the conical tube section by welding; the flaring section is in the shape of a horn that spreads toward the top, and a part of the flaring section and/or the straight tube section is inserted into the outer tube 710.

Figure 19:
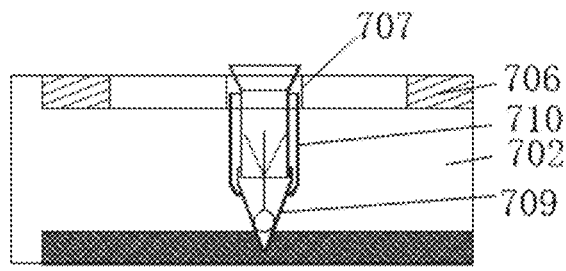
FIG. 19 shows a schematic diagram of the state in which the cutting tube is inserted into the planting base in the equipment for in-situ restoration of sediment according to an exemplary embodiment of the present invention.

A pair of first cutting tubes 713 and a pair of second cutting tubes 714 can expand and contract synchronously, thereby driving the inner tube 709 and the outer tube 710 to rise and fall synchronously. When the transplanter 704 conveys the submerged plants on the plant storage plate 715 from the flaring section of the inner tube 709 to the inner tube 709, as shown in FIG. 19, the submerged plants fall into the conical tube section, and a pair of first cutting tube 713 and a pair of second cutting tubes 714 retract synchronously, so that multiple cutting tubes 708 descend synchronously until the bottom tip of the inner tube 709 contacts the planting base and performs cutting on the surface of the planting base to form holes.

Figure 20:
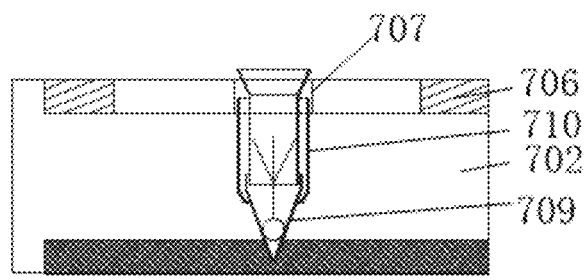
FIG. 20 shows a schematic diagram of the state of the submerged plants in the cutting tube falling into the hole in the equipment for in-situ restoration of sediment according to an exemplary embodiment of the present invention.

A pair of second cutting tubes 714 drive the second connecting rod 712 to rise, so that the outer tube 710 rises relative to the inner tube 709, as shown in FIG. 20, the bottom of the outer tube 710 is connected to the conical tube section to turn outwards, causing the tip of the conical tube section spread outward, thus the submerged plants fall into the holes, and the cutting is completed.

The tip of the bottom of the conical tube section of the inner tube 709 is surrounded by multiple sharp-bottomed pieces, so that it can be slightly turned outward under the drive of the outer tube 710 to make the submerged plants fall.

The bottom of the submerged plant is wrapped with wrapping sediment, so that it can be clamped and dropped from the cutting tube 708.

As shown in FIG. 14, the transplanter 704 is an existing equipment, which is connected to the processing platform through a bracket. The transplanter 704 comprises a plant storage plate 715, multiple plant conveyor belt assemblies and multiple manipulators 716 provided obliquely, and multiple plant conveyor belt assemblies are provided at intervals along the direction perpendicular to the line between the sediment shaping device 6 and the grass blanket processing device 7; the plant conveyor belt of each plant conveyor belt assembly is provided with multiple positioning plates provided at intervals along the conveying direction, and the positioning plates of multiple plant conveyor belt assemblies are horizontally aligned to form a horizontal row for placing a plant storage plate 715. The positioning plate and the plant conveyor belt are connected at a predetermined angle, so that the plant storage plate 715 is placed on the positioning plate and tilted slightly inward to avoid falling due to shaking of the equipment.

Multiple manipulators 716 are close to the bottom of multiple plant conveyor belt assemblies, and the tops of multiple plant conveyor belt assemblies are away from the manipulator 716, so that multiple plant conveyor belt assemblies are tilted so as to provide a working space for the manipulator 716.

The plant storage plate 715 is conveyed from top to bottom under the drive of multiple plant conveyor belt assemblies. When the plant storage plate 715 is conveyed to the preset seedling transplanting position, the manipulator 716 removes the submerged plants on the plant storage plate 715 and turns downwards, making submerged plants fall in the cutting tube 708.

Figure 21:
FIG. 21 shows a schematic diagram of the structure of a plant storage plate in the equipment for in-situ restoration of sediment according to an exemplary embodiment of the present invention.

Wherein, as shown in FIG. 21, one of the plant storage plates 715 is provided with an inwardly recessed positioning groove 717, including a straight groove section and an arc groove section, as the bottom of the submerged plants for cutting is wrapped with a wrapped sediment, the submerged plants to be cut are stuck into the arc groove section. The manipulator 716 can take out the submerged plants from top to bottom. During the process of taking out, a part wrapping the sediment falls off, as a result, the submerged plants are no longer stuck in the positioning groove 717.

Figure 22:
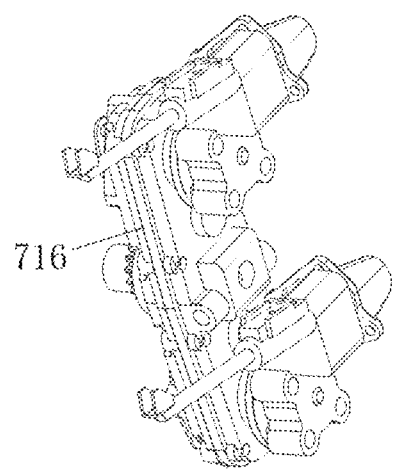
FIG. 22 shows a schematic diagram of the structure of the manipulator in the equipment for in-situ restoration of sediment according to an exemplary embodiment of the present invention.
Figure 23:
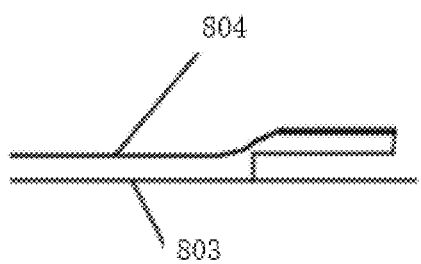
FIG. 23 shows a partial schematic diagram of the connection between the guide rail panel and the grass blanket pressing sheet in the equipment for in-situ restoration of sediment according to an exemplary embodiment of the present invention.

The manipulator 716 is an existing product, as shown in FIG. 22, the manipulator 716 usually has two clamping parts, which can move in a circular motion in the vertical direction under the drive of the driving motor, and the clamping parts always maintain the state of protruding. The specific structure and working principle of the manipulator 716 will not be described in detail.

The manipulator 716 takes out the submerged plants and moves in a circle along the preset trajectory. When the clamping part of the manipulator 716 moves to the bottom with the submerged plants, the submerged plants automatically fall to the inner tube 709 of the cutting tube 708 due to gravity, and is positioned at the conical tube section, to be placed on the planting base through cutting.

Multiple positioning holes 707 on the positioning net and multiple cutting tubes 708 of the cutting assembly 703 are respectively provided along the line perpendicular to the connection between the sediment shaping device 6 and the grass blanket processing device 7, so as to simultaneously grow submerged plants with preset length and quantity on the planting base through cutting and achieve the effect of cutting in rows. After the submerged plants are placed on the planting base through cutting, a submerged grass blanket 9 is formed.

As shown in FIG. 15, the first push plate device 705 is provided on the side of the processing platform facing the sediment shaping device 6, the push plate device includes a first push plate and a first push plate cylinder, and the first push plate cylinder is connected to the processing platform, and provided along the direction parallel to the connecting line between the sediment shaping device 6 and the grass blanket processing device 7, the first push plate cylinder is used to drive the first push plate to move in the horizontal direction, so as to push the planting base from the inlet of the planting base into the grass blanket fixing bin 702, locate the planting base at the preset cutting position, and completing the cutting of the planting base; after the submerged grass blanket 9 is formed, the first push plate cylinder can drive the first push plate to continue to extend, so that the first push plate pushes the submerged grass blanket 9 to move out of the scope of the grass blanket fixing bin 702 from the outlet of the grass blanket.

The planting base is rectangular or bar-shaped, the first push plate is provided parallel to the length direction of the planting base, and the width of the first push plate is smaller than the distance between a pair of spacing plates.

The grass blanket processing device 7 also comprises a second push plate device 718, as shown in FIG. 15, the second push plate device 718 comprises a second push plate and a second push plate cylinder, and the second push plate is provided in direction parallel to the width of the submerged grass blanket 9, and the second push plate cylinder is provided along the direction perpendicular to the first push plate cylinder. After the planting base forms the submerged grass blanket 9, the second push plate pushes the submerged grass blanket 9 to the grass blanket paving device 8 under the drive of the second push plate cylinder.

The grass blanket paving device 8 comprises:
a grass blanket conveyor belt assembly that is provided on the amphibious platform 1 along the horizontal direction, and is used to convey the submerged grass blanket 9, and one end of the grass blanket conveyor belt is attached to the processing platform;
a paving guide rail 803, one end of which is connected to one end of the amphibious platform 1 in an inclined shape, and is provided near the other end of the grass blanket conveyor belt, and the other end of the paving guide rail 803 extends into the water and is close to the screw suction device 2;
a pair of grass blanket pressing sheets 804 that are provided on both sides of the paving guide rail 803;
the second push plate device 718 pushes the submerged grass blanket 9 onto the grass blanket conveyor belt assembly which conveys the submerged grass blanket 9 onto the paving guide rail 803, and the submerged grass blanket 9 slides along the area between a pair of grass blanket pressing sheets 804 and the paving guide rail 803 to the water where the screw suction device 2 is located.

the grass blanket conveyor belt assembly includes a first conveyor belt assembly 801 and at least one second conveyor belt assembly 802, the first conveyor belt assembly 801 is provided perpendicular to the line direction between the sediment shaping device 6 and the grass blanket processing device 7, the second conveyor belt assembly 802 are provided vertically to the first conveyor belt assembly 801, and the two ends of the first conveyor belt assembly 801 are close to one end of the grass blanket processing device 7 and the second conveyor belt assembly 802 respectively, and the other end of the second conveyor belt assembly 802 is close to the pre-dehydration device 3.

After the planting base forms the submerged grass blanket 9, the first push plate stretches out under the drive of the first push plate cylinder to push the submerged grass blanket 9 out of the scope of the grass blanket fixing bin 702, and push it to a position corresponding to the second push plate which protrudes downwards driven by the second push plate cylinder, and pushes the submerged grass blanket 9 toward the first conveyor belt assembly 801 along a direction perpendicular to the pushing direction of the first push plate. The submerged grass blanket 9 is conveyed on the first conveyor belt assembly 801, and when the submerged grass blanket 9 is conveyed to contact the second conveyor belt assembly 802, due to the conveying directions of the second conveyor belt assembly 802 and the conveying direction of the first conveyor belt assembly 801 are vertical, one end of the submerged grass blanket 9 will rotate with the conveying direction of the second conveyer belt assembly 802, and be conveyed to the second conveyer belt assembly 802 as a whole.

In order to improve the conveying effect of the submerged grass blanket 9, in an embodiment of the present invention, the grass blanket paving device 8 further includes a guiding device 805, which is used to guide the convey of the submerged grass blanket 9 from the first conveyor belt assembly 801 to the second conveyor belt assembly 802.

As shown in FIG. 2, the guiding device 805 includes a first guiding plate and a second guiding plate, the first guiding plate is provided along the conveying direction of the second conveyor belt assembly 802, and the second guiding plate includes a first plate section and the second plate section, the first plate section is parallel to the first guide plate, and the second plate section forms an included angle with the first guide plate, so that the second guide plate and one end of the first guide plate diffuse outward, the other end is parallel, when the submerged grass blanket 9 is conveyed from the first conveyor belt assembly 801 to the second conveyor belt assembly 802, one end of the submerged grass blanket 9 contacts the second conveyor belt assembly 802, and rotates thereupon; one end of the submerged grass blanket 9 moves between the first guide plate and the second guide plate, and is rotated to be parallel to the conveying direction of the second conveyor belt assembly 802 under the action of the second guide plate, finally achieving a uniform conveying effect.

Both the first conveyor belt assembly 801 and the second conveyor belt assembly 802 include a conveyor belt installation bracket, a conveyor belt body, a wheel set and a driving motor for driving the conveyor belt to run, and guardrails on both sides of the conveyor belt installation bracket. Both the first conveyor belt assembly 801 and the second conveyor belt assembly 802 are existing products, and the specific structure and working principle will not be repeated here. Wherein, the first guide plate and the second guide plate are fixedly connected to the guardrails on both sides of the second conveyor belt assembly 802 respectively, so as to keep their positions unchanged.

When conveyed to the end of the second conveyor belt assembly 802, the submerged grass blanket 9 is driven onto the paving guide rail 803 under the inertia of the second conveyor belt assembly 802.

The paving guide rail 803 includes a guide rail panel, a pair of guard plates respectively connected to the two sides of the guide rail panel, a pair of grass blanket pressing sheets 804 parallel to the guide rail panel and connected to both sides of the guide rail panel, and the grass blanket pressing sheet 804 is provided along the length direction of the guide rail panel and forms a gap with the guide rail panel for the grass blanket to pass through.

One end of the paving guide rail 803 is hinged to the amphibious platform 1, the other end extends into the water, and it is bent to form a substantially horizontal direction. The submerged grass blanket 9 slides down through the gap along the grass blanket to the approximate position where the sediment to be sucked is provided, and slides out to the bottom along the other end of the paving guide rail 803; and the submerged grass blanket 9 is planted through cutting with submerged plants suitable for the ecological environment of the original waters, and the effect of in-situ restoration of sediment can finally achieved. Thus, the polluted sediment can be restored without damaging the ecological environment.

The paving guide rail 803 is provided in an inclined shape, and the bottom of which is drivingly connected with the amphibious platform 1 through the guide rail cylinder. The expansion and contraction of the guide rail cylinder can drive the paving guide rail 803 to rotate, thereby adjusting the inclination angle of the paving guide rail 803 to be suitable for treatment of sediment of different heights.

Figure 3:
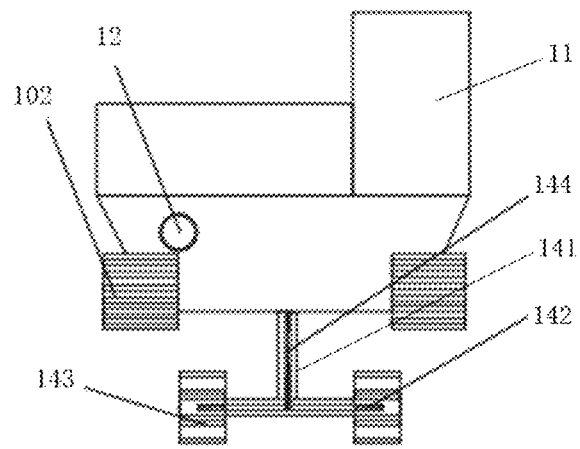
FIG. 3 shows the side view of the equipment for in-situ restoration of sediment according to an exemplary embodiment of the present invention.

In one embodiment of the present invention, as shown in FIG. 3, The equipment for in-situ restoration of sediment also includes:
- a control room 11 that at least controls the operation of the screw suction device 2, the dehydration device, the sediment treatment device, the grass blanket processing device 7, and the grass blanket paving device 8;
- an auxiliary driving device 14, comprising:
- a connecting rod 141, one end of which is hinged on the other end of amphibious platform 1;
- a connecting shaft 142 that is vertically connected to the other end of the connecting rod 141;
- a pair of driving wheels 143 that are respectively provided on the two ends of the connecting shaft 142, and can extend into water;
- a driving device that is provided at the other end of the amphibious platform 1;
- a synchronous belt assembly 144 that is connected to the driving device and the connecting rod 141 respectively, and the driving device drives the synchronous belt assembly 144 to rotate so that the connecting rod 141 drives a pair of driving wheels 143 to rotate.

Specifically, as shown in FIGS. 1 and 2, the control room 11 is provided at the other end of the amphibious platform 1, which is provided with a controller and a console for controlling the operation of various components, such as the amphibious track 102, the hoisting device, the screw suction head 202, the sediment pump, the rake synchronous belt driving device, the vacuum pump 403, the stirrer 502, the metering pump, the press 605, the sedimentation tank 301 of pre-dehydration device 3 and the sediment tank 401 of the vacuum dehydration device 4, the sediment storage tank 401 and the reaction tank 501 of the sediment improvement reaction device 5, the convey path of the hopper 13 between the reaction tank 501 and the sediment-inlet bucket 604 of the sediment shaping device 6, the transplanter 704, the cutting assembly 703, the first conveyor belt assembly 801 and the second conveyor belt assembly 802. Controlling the operation of each component by a controller belongs to a prior art, and the specific principles and processes will not be repeated in the present invention.

The auxiliary driving device 14 is hinged to the amphibious platform 1 through the connecting rod 141, and a cylinder can be connected between the connecting rod 141 and the amphibious platform 1, so that the height of the connecting rod 141 can be adjusted by adjusting the expansion and contraction of the cylinder.

The driving device includes an auxiliary device driving motor which is fixed on the amphibious platform 1. The synchronous belt assembly 144 includes a synchronous belt, a driving synchronous wheel and a driven synchronizing wheel; and the driving synchronous wheel is connected to the output shaft of the auxiliary device driving motor and the driven synchronous wheel is connected to the connecting shaft 142. The synchronous belt is wound around the driving synchronous wheel and the driven synchronous wheel; the connecting shaft 142 is connected to the other end of the connecting rod 141 through bearing rotation, and when the controller controls the auxiliary device to drive the motor to move, the driving synchronous wheel rotates, and then drives the driven synchronous wheel to rotate through the synchronous belt, so that the connecting shaft 142 rotates, and finally drives a pair of driving wheels 143 to rotate synchronously to act on the water and achieve the effect of auxiliary driving.

Wherein, as shown in FIG. 1, the driving wheel 143 includes an installation tube and multiple wheel plates uniformly distributed on the outer wall of the installation tube along the circumferential direction. The wheel plates are provided radially along the installation tube which is used to connect and fix with the connecting shaft 142. The end of the connecting shaft 142 is provided with a clamping part, and the center of the installation tube is provided with a clamping hole, and the clamping part is clamped in the clamping hole to realize the fixed connection between the connecting shaft 142 and the installation tube. In order to improve the connection strength, locking bolts can also be provided in the radial direction of the installation tube.

The equipment for in-situ restoration of sediment relies on its own power, that is, the amphibious track 102 provides formal power, and on this basis, it cooperates through the auxiliary driving device 14. On the one hand, the auxiliary driving device 14 can provide an auxiliary power source for power transmission, so that the amphibious platform 1 is powered to reduce the resistance of the amphibious track 102, and on the other hand, it can perform direction control.

In the present invention, the drainage pipe 10 is provided along the amphibious platform 1 and is provided parallel to the second conveyor belt assembly 802. The sedimentation tank 301 and the filtered water storage area 404 are respectively communicated with the drainage pipe 10 through pipelines, and one end of the drainage pipe 10 can be provided with a drain pump to promote the discharge of water. The other end of the drainage pipe 10 is a drainage port 12 that is provided at the other end of the amphibious platform 1. The drainage port 12 of the drainage pipe 10 communicates with the outside, so that the water is discharged directly to the original waters.

The working process of the equipment for in-situ restoration of sediment involved in the present invention is as follows:

the other end of the screw suction device 2 is adjusted to an appropriate position according to the waters information, the depth of the sediment, etc.; the controller controls the operation of the screw suction device 2 to suck the sediment, and the position of the sediment to be sucked is adjusted through the movement of amphibious platform 1; the sediment is conveyed from the sediment delivery pipe 203 to the top of the sedimentation tank 301 on the amphibious platform 1, and impurities such as water plants or large particles are scraped away from the falling sediment through the slag scraping device 303 and conveyed to the collection bin 304; the aquatic organisms are screened through the mesh screen 307 of the biological screening device 302, and are collected manually or by the slag scraping device 303 to be put back in the original waters; and the sediment falling into the sedimentation tank 301 through the mesh screen 307 is precipitated to form sediment-and-water separated state, the water in the upper layer is discharged into the drainage pipe 10 through the water outlet of the sedimentation tank 301, and is discharged back to the original waters through the water outlet 12 to realize the pre-dehydration process. The sediment in the sedimentation tank 301 is excavated through the hopper 13 and poured into the sediment storage tank 401, and the vacuum pump 403 is used to provide negative pressure to the sediment storage tank 401, thus the water in the sediment passes through the filter layer 402 and gathers to the filtered water storage area 404, and is discharged into the drainage pipe 10 through the vacuum pump 403, and returns to the original waters. The sediment in the sediment storage tank 401 is stopped by the filter layer 402 and remains in the sediment storage tank 401 to realize the vacuum dehydration process, forming low-water sediment. The sediment in the sediment storage tank 401 is excavated and conveyed into the reaction tank 501 through the hopper 13, and the chemicals in the chemical storage tank 503 are injected into the reaction tank 501 through the metering pump and the chemical delivery pipe, and react with the sediment under the action of the stirrer 502, to oxidize the reducing substances in the sediment, and then realize the improvement of the sediment, and finally bio-safety disposed sediment is obtained. The dry sediment in the reaction tank 501 is excavated and conveyed to the sediment inlet-bucket 604 through the hopper 13, injected into the mold through the output port of the sediment inlet-bucket 604 with a preset metering, and pressed by a press 605 in the mold to extrude, thus the planting base is obtained, which then is put into the grass blanket fixing bin 702, and pushed to the preset cutting position through the first push plate device 705; the transplanter 704 puts the submerged plants on the plant storage plate 715 into the cutting tube 708, drives the first cutting tube 713 and the second cutting tube 714 to retract synchronously, so that the cutting tube 708 is lowered to the preset cutting position. At this time, the bottom tip of the inner tube 709 of the cutting tube 708 contacts the planting base and forms holes on the surface of the planting base through cutting; the transplanter 704 drives the second cutting tube 714 to drive the second connecting rod 712 to rise, make the outer tube 710 rise relative to the inner tube 709, and drive the bottom of the inner tube 709 to turn slightly, so that the submerged plants fall into the corresponding holes on the planting base, finally the planting is completed and the submerged grass blanket 9 is formed. The submerged grass blanket 9 is pushed out from the outlet of the grass blanket to the position to be conveyed by the first push plate device 705, is then pushed onto the first conveyor belt assembly 801 by the second push plate device 718, and is conveyed along the first conveyor belt assembly 801 onto the second conveyor belt assembly 802 and is guided by the guiding device 805 so as to be uniformly conveyed along the second conveyor belt assembly 802 to the paving guide rail 803. When conveyed to the end of the second conveyor belt assembly 802, the submerged grass blanket 9 moves to the paving guide rail 803 by inertia, and is then conveyed to the original suction point of the sediment along the paving guide rail 803, and finally falls back to the suction point of the sediment in the original waters, so the purpose of in-situ restoration of sediment and restoration of submerged vegetation is realized.

The invention has a reasonable structural design, can operate under complex working conditions such as rivers, lakes, muddy land, swamps, etc., can work in water, does not need an ex-situ treatment of sediment, will not cause secondary pollution, and will not affect the original ecological system. The highly polluted sediment is treated to form a planting base for the growth of submerged vegetation, which can be reused in the form of a planting base. It integrates sediment improvement and submerged vegetation restoration, and realizes the joint governance of sediment, water and grass by in-situ restoration of river and lake sediment, can quickly restore the ecological functions of rivers and lakes and the water circulation system, improve the self-purification capacity of rivers and lakes, improve the overall ecological environment of rivers and lakes, and provide residents with a better living space.

It can be understood that related features in the above devices can refer to each other. In addition, "first", "second" and so on in the above embodiments are used to distinguish each embodiment, and do not represent the advantages and disadvantages of each embodiment.

In the description provided herein, numerous specific details are provided forth. However, it is understood that embodiments of the invention may be practiced without these specific details. In some instances, well-known structures and techniques have not been shown in detail in order not to obscure the understanding of this description.

The above is only a specific embodiment of the present invention, but the scope of protection of the present invention is not limited thereto. Anyone skilled in the art within the technical scope disclosed in the present invention can easily think of changes or substitutions, which should be covered by the protection scope of the present invention. Therefore, the protection scope of the present invention should be determined by the protection scope of the claims.

The invention claimed is:

1. An equipment for in-situ restoration of sediment, comprising an amphibious platform and following devices provided thereon:

a screw suction device, one end of which is hinged to one end of the amphibious platform, and the other end of which can extend into the sediment for sucking sediment;

a dehydration device that is provided downstream of the screw suction device and communicated with the one end of the screw suction device for dehydrating the sediment;

a sediment treatment device that is provided downstream of the dehydration device for treating the sediment and processing it into a planting base;

a grass blanket processing device that is provided downstream of the sediment treatment device for planting submerged plants on the planting base to form a submerged grass blanket;

a grass blanket paving device, one end of which is close to the grass blanket processing device, and the other end of which extends toward the screw suction device and extends into the water, for paving the submerged grass blanket to the bottom of the water;

a drainage pipe that respectively communicates with the dehydration device and the sediment treatment device; and a hopper through which the sediment is conveyed between the dehydration device and the sediment treatment device.

2. The equipment for in-situ restoration of sediment according to claim 1, wherein, the screw suction device comprises:

a connecting bracket, one end of which is hinged to the amphibious platform;

a hoisting device that is connected to the middle of the connecting bracket, and is used to drive the other end of the connecting bracket to lift;

a screw suction head that is connected to the other end of the connecting bracket for sucking the sediment;

a sediment delivery pipe, one end of which communicates with the screw suction head and the other end communicates with the dehydration device, and the sediment delivery pipe is provided along the connecting bracket.

3. The equipment for in-situ restoration of sediment according to claim 2, wherein, the screw suction head includes:

a collecting cover that is connected to the bottom of the connecting bracket;

a diversion cover that is fastened with the collecting cover to form a sediment suction space, and the top of which communicates with the sediment delivery pipe;

a reamer shaft that is rotatably connected to the bottom of the sediment suction space;

a reamer that is helically provided on the reamer shaft.

4. The equipment for in-situ restoration of sediment according to claim 1, wherein, the dehydration device includes a pre-dehydration device which includes:

a sedimentation tank that is provided on the amphibious platform, and the sediment sucked by the screw suction device falls into the sedimentation tank from above the sedimentation tank;

a biological screening device that is connected in the sedimentation tank;

a slag scraping device that is provided above the sedimentation tank for removing large particles of impurities in the sediment;

a collection bin that is attached to the sedimentation tank and provided on the amphibious platform.

5. The equipment for in-situ restoration of sediment according to claim 4, wherein, a water outlet is provided on the wall of the sedimentation tank, and the water outlet is communicated with the drainage pipe;

the biological screening device includes a mesh screen that is connected to the wall of the sedimentation tank and is provided above the water outlet;

the slag scraping device includes a track assembly and a rake that is provided on the track assembly, one end of the track assembly is provided above the sedimentation tank, and is provided above the mesh screen, and the other end is provided above the collection bin.

6. The equipment for in-situ restoration of sediment according to claim 4, wherein, the dehydration device further comprises a vacuum dehydration device provided downstream of the pre-dehydration device, and the vacuum dehydration device comprises:

a sediment storage tank that is provided on the amphibious platform, and is attached to the sedimentation tank, for storing the sediment conveyed by the sedimentation tank;

a filter layer that is provided below the sediment storage tank, and forms a filtered water storage area with the bottom of the sediment storage tank;

a vacuum pump that is provided on the amphibious platform, the inlet of which communicates with the filtered water storage area, and the outlet of which communicates with the drainage pipe.

7. The equipment for in-situ restoration of sediment according to claim 5, wherein, the sediment treatment device includes a sediment improvement reaction device and a sediment shaping device, and the sediment improvement reaction device is provided downstream of the vacuum dehydration device and upstream of the sediment shaping device; the sediment improvement reaction device includes:

a reaction tank that is provided on the amphibious platform;

a stirrer, the top of which is connected to the top of the reaction tank, and the bottom of which extends into the bottom center of the reaction tank;

a chemical storage box that is provided above one side of the reaction tank, and communicates with the reaction tank through a chemical delivery pipe, and the chemical storage box stores sediment improvement chemicals;

the sediment shaping device includes:

a shaping device bracket that is provided on the amphibious platform, and is provided downstream of the sediment improvement reaction device, and the bottom of the shaping device bracket is provided with a working table;

a pair of mold coamings that are provided on the working table, and spliced to form a rectangular mold;

a pair of telescopic rods, each pair of which is connected to the outside of one of the mold coamings;

a sediment inlet-bucket, the top of which is provided on the shaping device bracket, and the bottom of which is provided on the side above the mold;

a press that is provided on the shaping device bracket and is provided above the mold, and can press the sediment within the scope of the mold to form the planting base.

8. The equipment for in-situ restoration of sediment according to claim 7, wherein, there are multiple hoppers, which are at least respectively provided between the sedimentation tank of the pre-dehydration device and the sediment storage tank of the vacuum dehydration device, the sediment storage tank and the reaction tank of the sediment improvement reaction device, and the reaction tank and the sediment inlet-bucket of the sediment shaping device.

9. The equipment for in-situ restoration of sediment according to claim 8, wherein, the hopper includes:
- a sediment bucket;
- a rotating base that is provided on the amphibious platform;
- a sediment bucket supporting arm, one end of which is hinged to the sediment bucket, and the other end of which is hinged to the rotating base, and the sediment bucket can be driven by the rotating base and the sediment bucket supporting arm to rotate in the horizontal direction, move and turn over in the vertical direction.

10. The equipment for in-situ restoration of sediment according to claim 7, wherein,
the grass blanket processing device comprises:
- a processing device support that is provided on the amphibious platform, and is provided with a processing platform provided along the horizontal direction;
- a grass blanket fixing bin that is provided on the processing platform;
- a cutting component that is provided above the grass blanket fixing bin;
- a transplanter that is provided on the equipment support, the transplanter is provided with a plant storage plate, and is used to convey the submerged plants on the plant storage plate into the cutting assembly;
- a first push plate device that is provided on the processing platform, and is provided at one side of the grass blanket fixing bin.

11. The equipment for in-situ restoration of sediment according to claim 10, wherein,
top of the grass blanket fixing bin is provided with a cutting positioning net through which the cutting assembly is positioned;
the cutting assembly includes multiple cutting tubes, a first connecting rod, a second connecting rod, a first cutting tube and a second cutting tube, the cutting tube includes an outer tube and an inner tube, and the inner tube passes through the outer tube and is used to accommodate the submerged plants, and the top and bottom of the inner tube are respectively exposed outside the outer tube; the bottom of the outer tube is connected to the outer wall of the inner tube, and the bottom of the inner tube is provided with an opening; the first connecting rod is connected to multiple inner tubes, the second connecting rod is connected to the outer tube; the first cutting tube is drivingly connected to the first connecting rod along the vertical direction, the second cutting tube is drivingly connected to the second connecting rod along the vertical direction.

12. The equipment for in-situ restoration of sediment according to claim 11, wherein, the grass blanket paving device comprises:
- a grass blanket conveyor belt assembly that is provided on the amphibious platform along the horizontal direction, and one end of the grass blanket conveyor belt is close to the processing platform;
- a paving guide rail, one end of which is connected to one end of the amphibious platform, and is provided close to the other end of the grass blanket conveyor belt, and the other end of the paving guide rail extends into the water and is close to the screw suction device;
- a pair of grass blanket pressing sheets that are provided on both sides of the paving guide rail;
- the grass blanket conveyor belt assembly conveys the submerged grass blanket onto the paving guide rail, and the submerged grass blanket slides along the area between a pair of grass blanket pressing sheets and the paving guide rail to the water where the screw suction device is located.

13. The equipment for in-situ restoration of sediment according to claim 1, wherein, further comprising:
- a control room which at least controls the operation of the screw suction device, the dehydration device, the sediment treatment device, the grass blanket processing device, and the grass blanket paving device;
- an auxiliary drive device, comprising:
- a connecting rod, one end of which is hinged to the other end of the amphibious platform;
- a connecting shaft that is vertically connected to the other end of the connecting rod;
- a pair of driving wheels that are respectively provided at the two ends of the connecting shaft, and can extend into the water;
- a driving device that is provided at the other end of the amphibious platform;
- a synchronous belt assembly that is respectively connected to the driving device and the connecting rod, and the driving device drives the synchronous belt assembly to rotate, so that the connecting rod drives a pair of the driving wheels to rotate.

\* \* \* \* \*